United States Patent
Gibson, Jr. et al.

(10) Patent No.: US 7,130,333 B2
(45) Date of Patent: Oct. 31, 2006

(54) METHOD AND DEVICE FOR FRAME SYNC DETECTION USING CHANNEL COMBINING AND CORRELATION

(75) Inventors: Leroy Andrew Gibson, Jr., Riverton, UT (US); Dan M. Griffin, Bountiful, UT (US); Lyman D. Horne, Salt Lake City, UT (US); Randal R. Sylvester, West Valley City, UT (US)

(73) Assignee: L-3 Communications Corporation, New York, NY (US)

( * ) Notice: Subject to any disclaimer, the term of this patent is extended or adjusted under 35 U.S.C. 154(b) by 863 days.

(21) Appl. No.: 09/995,095

(22) Filed: Nov. 27, 2001

(65) Prior Publication Data

US 2003/0099281 A1   May 29, 2003

(51) Int. Cl.
*H04B 1/707* (2006.01)
(52) U.S. Cl. .................................... 375/150; 375/368
(58) Field of Classification Search ................ 375/368, 375/144, 148, 349
See application file for complete search history.

(56) References Cited

U.S. PATENT DOCUMENTS

| | | | |
|---|---|---|---|
| 5,691,974 A | 11/1997 | Zehavi et al. ............... 370/203 |
| 5,909,437 A * | 6/1999 | Rhodes et al. ............. 370/349 |
| 6,064,690 A * | 5/2000 | Zhou et al. ................. 375/142 |
| 6,707,846 B1 * | 3/2004 | Iwamatsu .................... 375/150 |

* cited by examiner

*Primary Examiner*—Kevin Kim
(74) *Attorney, Agent, or Firm*—Harrington & Smith, LLP

(57) ABSTRACT

A method and device for frame sync detection using signal combining and correlation. The method comprises the steps of despreading PN coded signals to provide in-phase $I_1-I_n$, and quadrature phase $Q_1-Q_n$ signals, wherein each $I_1-I_n$ and each $Q_1-Q_n$ signal contains at least one sync bit and $n \geq 2$. The at least one sync bit from each $I_1-I_n$ and quadrature phase $Q_1-Q_n$ signals are summed to form sums $I_{s1}$ and $Q_{s1}$, respectively. The next step provides a reference sync having at least one bit and compares each sum $I_{s1}$ and $Q_{s1}$ with the at least one reference bit. The results of each $I_{s1}$ and $Q_{s1}$ comparison are accumulated so as to form two accumulates, $I_A$ and $Q_A$, respectively. Each accumulate $I_A$ and $Q_A$, is squared to form $I_A^2$ and $Q_A^2$ from which the sum $I_A^2$ and $Q_A^2$ is formed. The sum $I_A^2+Q_A^2$ is compared with a predetermined threshold and as a result of the comparison a determination of whether frame sync has been achieved is made.

25 Claims, 4 Drawing Sheets

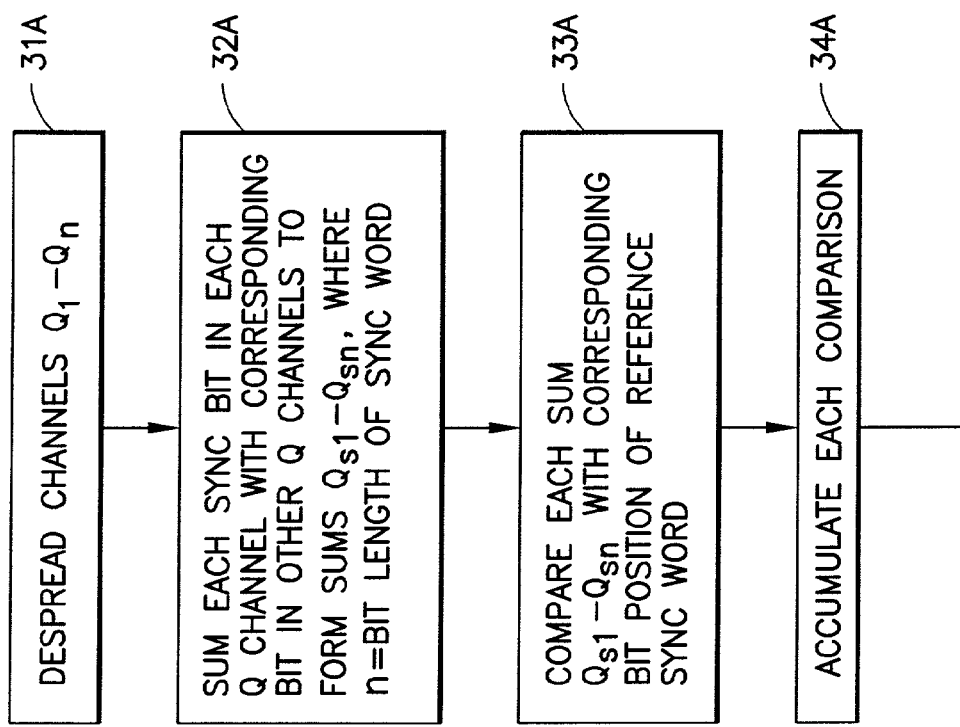
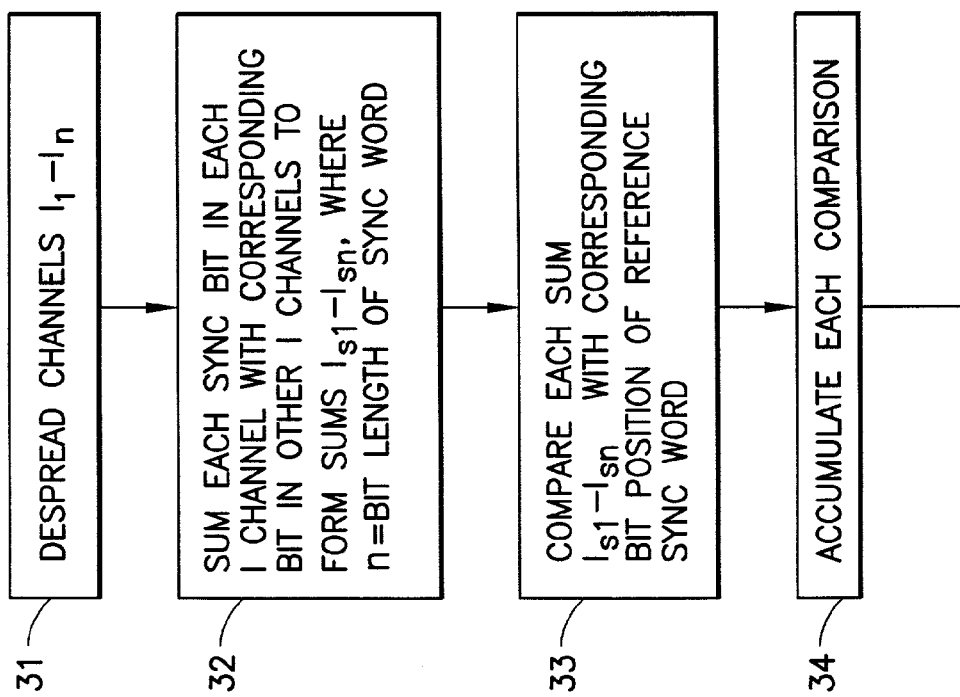
FIG. 3A
FIG. 3B
FIG. 3

METHOD AND DEVICE FOR FRAME SYNC DETECTION USING CHANNEL COMBINING AND CORRELATION

BACKGROUND

1. Field of Use

These teachings relate generally to communications systems such as wireless data or telephone systems. More particularly, the invention relates frame sync detection using channel combining and correlation in systems requiring frame synchronization.

2. Description of Prior Art

A variety of multiple access communication systems have been developed for transferring information among a large number of system users. Techniques employed by such multiple access communication systems include time division multiple access (TDMA), frequency division multiple access (FDMA), and AM modulation schemes, such as amplitude companded single sideband (ACSSB), the basics of which are well known in the art.

In Spread Spectrum (SS) or TDMA-SS transmission systems a succession of short-duration bursts emanating from a number of different stations are presented to a demodulator. Each burst may contain data frames from one or more data channels. Each data frame generally contains a synchronization or sync word and a data payload area. The sync word must be rapidly identified in order to continue processing the data through subsequent processes such as de-interleaving or forward error correction (FEC) control circuits. Consequently rapid-identification of the sync word and its position within the stream of data is desired.

In general, identification of a sync word is accomplished by transmitting the sync word at a higher power level. The higher the power levels the higher the probability of finding the sync word. However, it can be readily appreciated that higher power levels used to transmit sync words lead to other disadvantages such as cross channel interference, or a difficulty in controlling the automatic gain control (AGC) circuits of the transmitter and the receiver. For example, higher power levels for sync words can cause reception problems in satellite systems where the power levels across multiple signals must have approximately equal signal strength. This is particularly necessary if Intermediate Frequency (IF) limiting or traveling wave tube amplifiers are employed in order to avoid suppression of weaker signals. In addition, systems relying on a high power sync word or frame may never achieve synchronization if the energy level of the sync word is degraded during transmission.

Another method for achieving frame sync is to find frame sync in consecutive frames. Each time the frame sync is found a confidence counter is incremented. Once the counter reaches a predetermined level then synchronization is declared. However, this approach requires the reception of multiple frames, as well as having to look for each phase ambiguity in systems where phase ambiguity is an issue. This procedure is also time intensive.

Therefore, it is desirable to reduce the amount of power required for frame sync. It is also desirable to provide rapid identification of frame sync even though frame sync power is decreased either through design or path degradation. It is further desirable to make more efficient use of the energy being transferred into the various communication channels or signals within a communication system.

SUMMARY OF THE PREFERRED EMBODIMENTS

The foregoing and other problems are overcome, and other advantages are realized, in accordance with the presently preferred embodiments of these teachings. As will be described below, important aspects of the invention reside in the summing of sync words from more than one channel in order to achieve frame sync.

In accordance with one embodiment of the invention a method for frame sync detection using signal combining and correlation is provided. The method includes the steps of despreading PN coded signals to provide in-phase $I_1$–$I_n$, and quadrature phase $Q_1$–$Q_n$ signals, wherein each $I_1$–$I_n$ and each $Q_1$–$Q_n$ signal contains at least one sync bit, and where $n \geq 2$. The at least one sync bit from each of the $I_1$–$I_n$ and quadrature phase $Q_1$–$Q_n$ signals are summed to form sums $I_{s1}$ and $Q_{s1}$, respectively. The next step provides a reference sync having at least one bit and compares each sum $I_{s1}$ and $Q_{s1}$ with the at least one reference bit. The results of each $I_{s1}$ and $Q_{s1}$ comparison are accumulated so as to form two accumulates, $I_A$ and $Q_A$, respectively. Each accumulate $I_A$ and $Q_A$ is squared to form $I_A^2$ and $Q_A^2$ from which the sum $I_A^2$ and $Q_A^2$ is formed. The sum $I_A^2+Q_A^2$ is compared with a predetermined threshold and as a result of the comparison a determination of whether frame sync has been achieved is made.

In accordance with another embodiment of the invention a device for frame sync detection using channel combining and correlation is provided. The device includes a channel despreader, wherein the channel despreader provides at least two each in-phase I1–In and quadrature phase Q1–Qn channels, where $n \geq 2$. The device also includes an I-sync processor and a Q-sync processor, both coupled to the channel despreader. The device also includes an address controller coupled to the I-sync processor and the Q-sync processor. A first summer connected to the I-sync processor and the Q-sync processor couples the sum to a threshold comparator for determination of sync detection.

Another embodiment of the invention is directed towards an integrated circuit (IC). The IC includes a channel despreader, providing at least two each in-phase I1–In and quadrature phase Q1–Qn channels, where $n \geq 2$. The IC also includes at least one I-sync processor coupled to the channel despreader and at least one Q-sync processor, also coupled to the despreader. An on-board IC first summer is connected to the I-sync processor and the Q-sync processor from which a sum is coupled to an on-board IC sync detection comparator.

The invention is also directed towards a program storage device readable by a machine, tangibly embodying a program of instructions executable by the machine to perform method steps for frame sync detection using signal combining and correlation. The method includes the steps of despreading PN coded signals to provide in-phase $I_1$–$I_n$ and quadrature phase $Q_1$–$Q_n$ signals, wherein each $I_1$–$I_n$ and each $Q_1$–$Q_n$ signal contains at least one sync bit, and where $n \geq 2$. The at least one sync bit from each $I_1$–$I_n$, and quadrature phase $Q_1$–$Q_n$ signals are summed to form sums $I_{s1}$ and $Q_{s1}$, respectively. The next step provides a reference sync having at least one bit and compares each sum $I_{s1}$ and $Q_{s1}$ with the at least one reference bit. The results of each $I_{s1}$ and $Q_{s1}$ comparison are accumulated so as to form two accumulates, $I_A$ and $Q_A$ respectively. Each accumulate $I_A$ and $Q_A$, is squared to form $I_A^2$ and $Q_A^2$ from which the sum $I_A^2$ and $Q_A^2$ is formed. The sum $I_A^2+Q_A^2$ is compared with a predetermined threshold and as a result of the comparison a determination of whether frame sync has been achieved is made.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
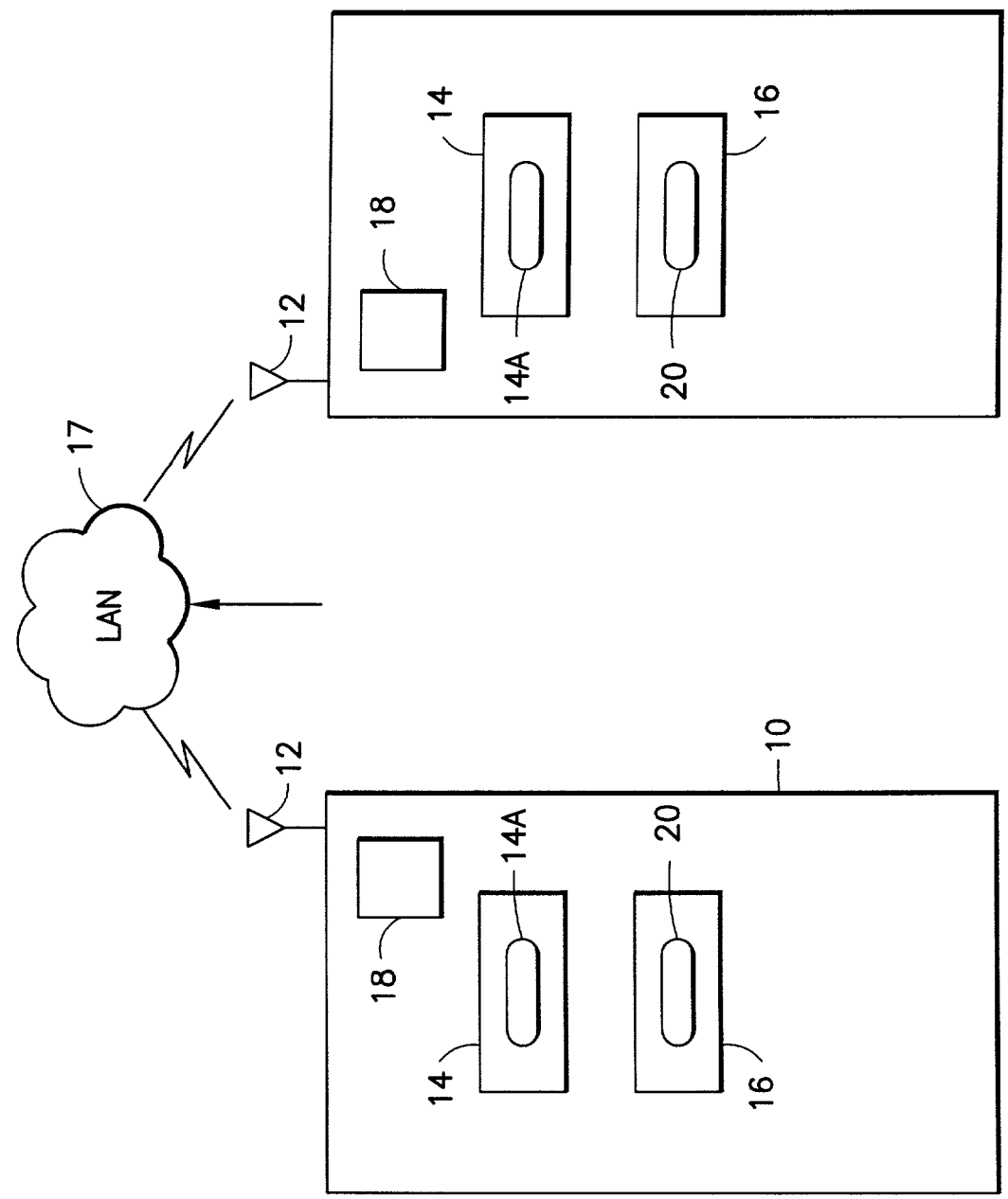
FIG. 1 is block diagram of a terminal device and a base station connected to a wireless local area network incorporating features of the present invention.

Although the present invention will be described with reference to the embodiment shown in the drawings, it should be understood that the present invention could be embodied in many alternate forms of embodiments. Exemplary, but not limiting embodiments include: mobile telephone systems requiring the reception and/or transmission of data and/or a satellite data system where information in the form of data is transmitted to a user.

Referring now to FIG. 1 there is shown an illustration for a wireless user terminal 10, such as but not limited to wireless local area networks (LANs) 17 that are suitable for practicing this invention. The wireless user terminal 10 includes an antenna 12 for transmitting signals to and for receiving signals from a base site 13, as well as a base transceiver station 14. In the preferred embodiment the transmitted signals are code division multiple access (CDMA) signals.

The mobile station and base transceiver station 14 includes a modulator (MOD) 14A, a transmitter 14, a receiver 16, a frame sync detector 20, and a controller 18 that provides signals to and receives signals from the transmitter 14 and receiver 16, respectively. It should be understood that the terminal device 10 could be vehicle mounted or a stationary device.

Figure 2:
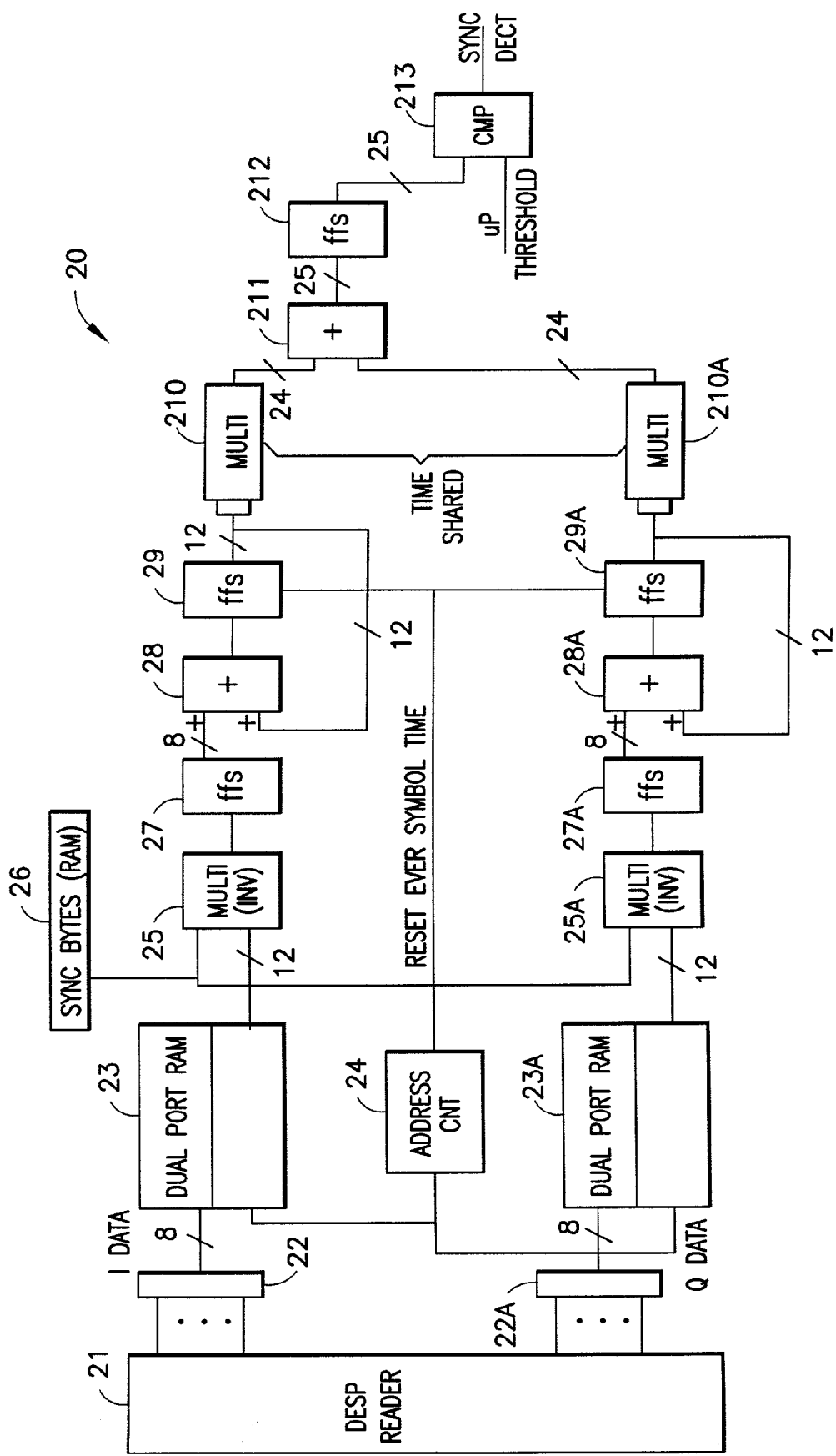
FIG. 2 is a block diagram of the frame sync detector shown in FIG. 1.

Referring also to FIG. 2 there is shown a block diagram of the frame sync detector 15 incorporating features of the present invention. It is understood that the signals received and despread by despreader 21 may have been transmitted by any suitable transmission technique in which a pseudo-noise (PN) code is employed as a modulation waveform. Exemplary, but not limiting, modulation techniques include direct sequence spread spectrum (DSSS) or Frequency Hop Spread Spectrum (FHSS) systems.

In the frame sync detector, there are at least one I-sync processor and at least one Q-sync processor. As shown in FIG. 2, the I-sync processor includes a first I-binary adder 22; an I-memory device 23, the I-memory device 23 coupled to the first I-binary adder; a reference sync 26; an I-multiplier 25, wherein the I-multiplier multiplies the reference sync 26 with the output of the I-memory device 23; an I-accumulator, wherein the I accumulator comprises: a first I-register bank 27; a second I-adder 28, the second I-adder 28 having at least two inputs, wherein one of the two inputs is coupled to an output of the first I-register bank 27; a second I-register bank 29, wherein an output of the second I-register bank 29 is coupled to an input of the second I-adder 28; and an I-squaring device 29. The Q-sync processor includes a first Q-binary.adder 22A, a Q-memory device 23A, the second Q-memory device 23A coupled to the first Q-binary adder 22A; a reference sync 26, a Q-multiplier 25A, where in the Q-multiplier 25A multipliesthe reference sync 26 with the output .of.the Q-rnemory device 23A; a Q-accumulator, wherein the Q-accumulator comprises a flrst Q-register bank 27A; a second Q-adder 28A, the second Q-adder 28A having at least two inputs, wherein one of the two inputs is coupled to an output of the first. Q-register bank 27A; a second Q-register bank 29A, wherein an output of the second Q-register bank 29A is coupled to an input of the second Q-adder 28A; and a Q-squaring device 29A.

Figure 3B:
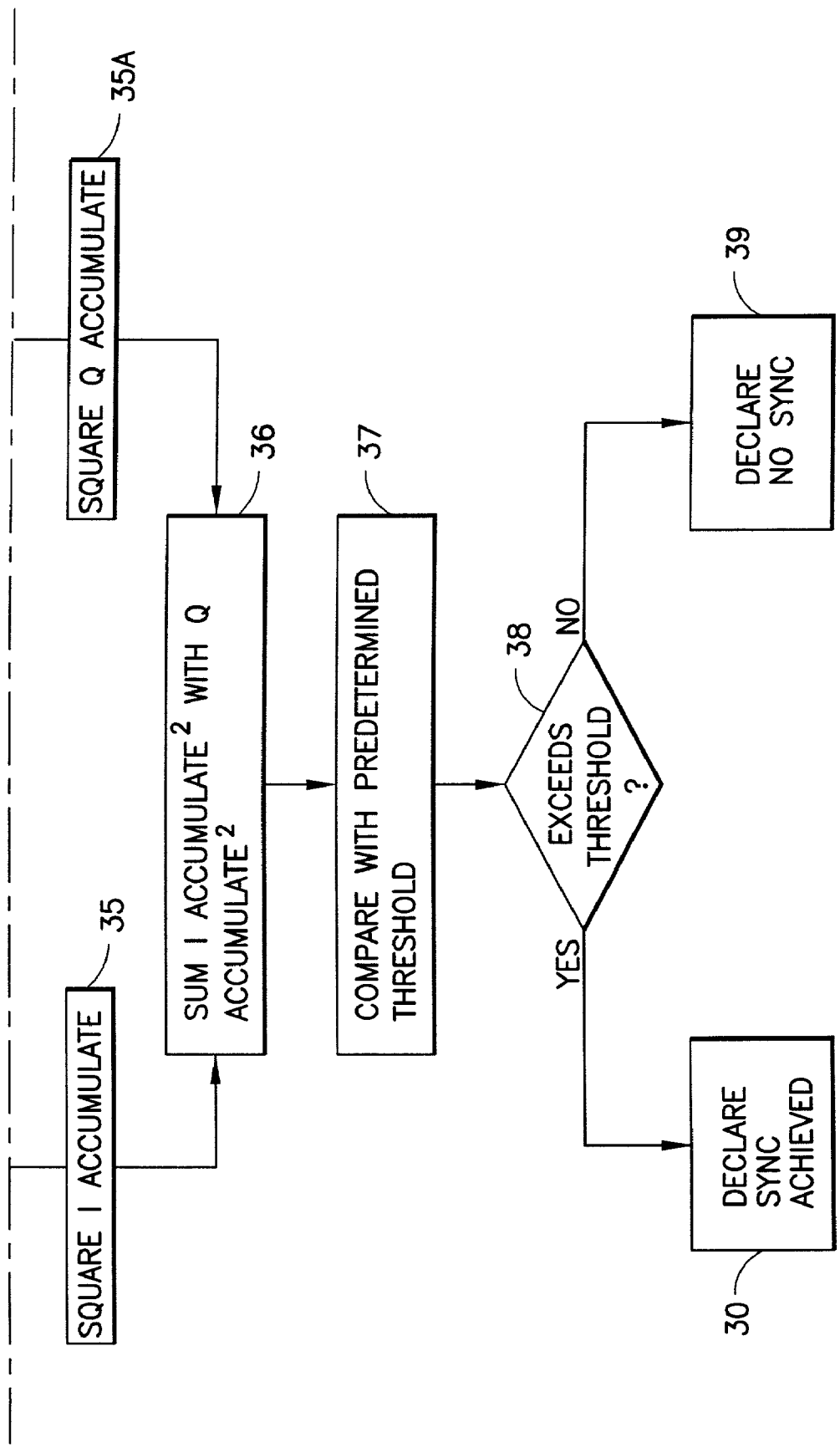
FIG. 3 is a flow chart of one method for frame sync detection for the system shown in FIG. 2.

Referring also to FIG. 3, Despreader 21 de-spreads 31, 31A a received signal by multiplying a signal modulated by the spreading code sequence (PN) of a received signal and a replica of the spreading code sequence (PN) at the receiving end, thereby taking a correlation between the two code sequences. Then, the correlation output is detected, and the establishment of the signal synchronization is detected by testing whether or not the detection output exceeds a threshold. If the signal synchronization has not yet been established, the phase of the replica of the spreading code sequence is shifted, and the detection of the synchronization is tested again. This is performed until the signal synchronization is established. The output of the despreader 21 is an $I_{1-n}$ and $Q_{1-n}$ digital data stream.

The $I_{1-n}$ and $Q_{1-n}$ data streams are parallel-clocked one bit at a time corresponding to a recovered symbol clock into column adders 22,22A, respectively. Adders 22,22A sum 32,32A the columns of bits and couples the sums to Dual Port RAMs 23, 23A. In the preferred embodiment the column sums are truncated to an eight-bit resolution. In alternate embodiments the sum resolution could be any suitable bit resolution.

Dual Port Rams 23,23A in the preferred embodiment are 16×16 dual port rams. In alternate embodiments the Dual Port Rams 23,23A could be any suitable matrix size. The added data is clocked into the Dual Port Rams 23,23A at the recovered symbol rate to an address controlled by address counter 24. The summed data representing the column sums are clocked out of the Dual Port RAMs 23,23A at a higher rate than the data is clocked in, preferably 32 or 64 times faster. The data is bit precision sign extended to 12 bits, or any suitable precision, and coupled to multipliers 25,25A where it is compared with known sync word 26, 33,33A. Converting the known sync word 26 to a series of 1's and/or −1's and then multiplying the converted sync word with the summed data accomplishes the comparison.

Registers 27,27A, adders 28,28A, and registers 29,29A accumulate the result of multipliers 25,25A, 34,34A. In the preferred embodiment registers 27,27A, 29,29A are D-Type latch registers or devices that perform similar functionality. In the preferred embodiment the result of multipliers 25,25A are accumulated a number of times equal to the length of the sync word 26. In alternate embodiments the number of accumulations could be any suitable number to determine sync.

The accumulated I values and Q are then coupled to squarers 210 and 210A and squared 35,35A, respectively, and subsequently summed 36 in adder 211 to provide non-coherent power detection. In the preferred embodiment squarer 210 is time shared so as to perform the functionality of squarer 210A. The sum of the squares is latched through register 212 to comparator 213 where it is compared 37 with a predetermined threshold. In an alternate embodiment the square root of the output of adder 211 could be taken in order to provide other system processing information.

If the summed columns from the $I_{1-n}$ and $Q_{1-n}$ data streams do not correspond to the sync word 26 then the accumulated value will be below a predetermined threshold and a no sync condition would be declared 39. Alternatively, if the summed columns from the $I_{1-n}$ and $Q_{1-n}$ data streams do correspond to the sync word 26 then the accumulated value will be relatively large and if the sum of the squares exceeds the predetermined threshold then comparator 213 outputs sync detect signal and frame sync is declared 30.

It should be understood that the foregoing description is only illustrative of the invention. Moreover, it will be readily appreciated that an advantage of the present invention is the use of multiple channels to detect frame sync. It will be further appreciated that advantages of the present invention include an effective increase of approximately 12 dB in the power level of the sync word (for a 16-bit sync word and twenty input channels $I_1$–$I_{20}$ and $Q_1$–$Q_{20}$). In addition, various alternatives and modifications can be devised by those skilled in the art without departing from the invention. Accordingly, the present invention is intended to embrace all such alternatives, modifications and variances that fall within the scope of the appended claims.

What is claimed is:

1. A method for frame sync detection using signal combining and correlation, the method comprising the steps of:
    despreading PN coded signals to provide in-phase $I_1$–$I_n$, and quadrature phase $Q_1$–$Q_n$ signals, wherein each $I_1$–$I_n$ and each $Q_1$–$Q_n$ signal contains at least one sync bit and where $n \geq 2$;
    summing the at least one sync bit from each $I_1$–$I_n$, and quadrature phase $Q_1$–$Q_n$ signals to form sums $I_{s1}$ and $Q_{s1}$, respectively;
    providing a reference sync, wherein the reference sync comprises at least one bit;
    comparing each sum $I_{s1}$ and $Q_{s1}$ with the at least one bit from the reference sync;
    accumulating the results of each $I_{s1}$ and $Q_{s1}$ comparison so as to form two accumulates, $I_A$ and $Q_A$, respectively;
    squaring each accumulate $I_A$ and $Q_A$, respectively, to form $I_A^2$ and $Q_A^2$;
    summing $I_A^2$ and $Q_A^2$; and
    comparing $I_A^2 + Q_A^2$ with a predetermined threshold and as a result of the comparison, making a determination whether frame sync has been achieved is made.

2. A method as in claim 1, wherein the step of despreading PN coded signals to provide in-phase $I_1$–$I_n$ and quadrature phase $Q_1$–$Q_n$ signals further comprises the step of letting n=20.

3. A method as in claim 1, wherein the step of summing the at least one sync bit from each $I_1$–$I_n$ and quadrature phase $Q_1$–$Q_n$ signals to form sums $I_{s1}$ and $Q_{s1}$, respectively, further comprises the step of forming sixteen sync bit sums from each $I_1$–$I_n$ and quadrature phase $Q_1$–$Q_n$ signals.

4. A method as in claim 3, wherein the step of providing the reference sync further comprises the step of providing a sixteen-bit reference sync.

5. A method as in claim 1, wherein the step of providing the reference sync further comprises the step of storing the reference sync in a local accessible memory.

6. A method as in claim 1, wherein the step of providing the reference sync further comprises the step of receiving the reference sync from a remote source.

7. A method as in claim 1, wherein the step of summing $I_A^2$ and $Q_A^2$ further comprises the steps of:
    performing a square root operation on the sum $I_A^2 + Q_A^2$; and
    comparing the square root of the sum $I_A^2 + Q_A^2$ with the predetermined threshold value.

8. A device comprising:
    a channel despreader, wherein the channel despreader provides at least two each in-phase I1–In and, quadrature phase Q1–Qn channels, where $n \geq 2$;
    at least one I-sync processor, wherein the at least one I-sync processor is coupled to the channel despreader, the at least one I-sync processor receiving I1–In data streams and providing an accumulated sciuared value $I_A$ as an output;
    at least one Q-sync processor, wherein the at least one Q-sync processor is coupled to the channel despreader, the at least one Q-sync processor receiving Q1–Qn data streams and providing an accumulated squared value $Q_A$ as an output;
    a first summer connected to the I-sync processor and the Q-sync processor to add the accumulated squared value $I_A$ and the accumulated squared value $Q_A$ to form a sum; and
    a comparator, wherein the comparator is coupled to the first summer and compares the sum to a predetermined threshold, wherein the comparator compares a sum from the first summer with a predetermined threshold and, as a result of the comparison, a determination whether frame sync has been achieved is made.

9. A device as in claim 8 wherein the channel despreader comprises a direct sequence spread spectrum (DSSS) despreader.

10. A device as in claim 8 wherein the channel despreader comprises a frequency hop spread spectrum (FHSS) despreader.

11. A device as in claim 8 wherein the at least one I-sync processor comprises:
    a first I-binary adder;
    a first I-memory device, the first I-memory device coupled to the first I-binary adder;
    a reference sync;
    a first I-multiplier, wherein the first I-multiplier multiplies the reference sync with the output of the first I-memory device to provide an I-multiplier result;
    a first I-accumulator, wherein the first accumulator comprises:
    a first I-register bank;
    a second I-adder, the second I-adder having at least two inputs, wherein one of the two inputs is coupled to an output of the first I-register bank;
    a second I-register bank, wherein an output of the second I-register bank is coupled to an input of the second I-adder; and
    a first I-squaring device, wherein the first I-squaring device is coupled to the output of the second I-register bank, wherein the first I-accumulator receives the I-multiplier result from the first I-multiplier and provides a sciuared accumulated I value.

12. A device as in claim 11 wherein the first I-binary adder comprises a two's-complement adder.

13. A device as in claim 11 wherein the first I-memory device comprises a first dual port 16×16 RAM.

14. A device as in claim 8 wherein the at least one Q-sync processor comprises:
    a first Q-binary adder;
    a first Q-memory device, the first Q-memory device coupled to the first Q-binary adder;

a first Q-multiplier, wherein the first Q-multiplier multiplies the reference sync with the output of the first Q-memory device to provide a Q-multiplier result;

a first Q-accumulator, wherein the first Q-accumulator comprises:

a first Q-register bank;

a second Q-adder, the second Q-adder having at least two inputs, wherein one of the two inputs is coupled to an output of the first Q-register bank;

a second Q-register bank, wherein an output of the second Q-register bank is coupled to an input of the second Q-adder; and a first Q-squaring device, wherein the first Q-squaring device is coupled to the output of the second Q-register device, wherein the first Q-accumulator receives the Q-multiplier result and provides a sciuared accumulated Q value.

15. A device as in claim 14 wherein the first Q-binary adder comprises a two's-complement adder.

16. A device as in claim 14 wherein the first Q-memory device comprises a first dual port 16×16 RAM.

17. An integrated circuit (IC), wherein the integrated circuit comprises:

a channel despreader, wherein the channel despreader provides at least two each in-phase I1–In and, quadrature phase Q1–Qn channels, where $n \geq 2$;

at least one I-sync processor, wherein the at least one I-sync processor is coupled to the channel despreader, the at least one I-sync processor receiving I1–In data streams and providing an accumulated squared value $I_A$ as an output;

at least one Q-sync processor, wherein the at least one Q-sync processor is coupled to the channel despreader, the at least one Q-sync processor receiving Q1–Qn data streams and providing an accumulated squared value $Q_A$ as an output;

a first summer connected to the I-sync processor and the Q-sync processor to add the accumulated squared value $I_A$ and the accumulated squared value $Q_A$ to form a sum; and a comparator, wherein the comparator is coupled to the first summer and compares the sum to a predetermined threshold, wherein the comparator compares a sum from the first summer with a predetermined threshold, and as a result of the comparison, a determination whether frame sync has been achieved is made.

18. An IC as in claim 17 wherein the IC comprises an Application Specific IC (ASIC).

19. An IC as in claim 17 wherein the IC comprises a field programmable gate array (FPGA).

20. A program storage device readable by a machine, tangibly embodying a program of instructions executable by the machine to perform method steps for frame sync detection using signal combining and correlation, the method comprising the steps of:

despreading PN coded signals to provide in-phase $I_1–I_n$, and quadrature phase $Q_1–Q_n$ signals, wherein each $I_1–I_n$ and each $Q_1–Q_n$ signal contains at least one sync bit and where $n \geq 2$;

summing the at least one sync bit from each $I_1–I_n$, and quadrature phase $Q_{1-Qn}$ signals to form sums $I_{s1}$ and $Q_{s1}$, respectively;

providing a reference sync, wherein the reference sync comprises at least one bit;

comparing each sum $I_{s1}$ and $Q_{s1}$ with the at least one bit from the reference sync;

accumulating the results of each $I_{s1}$ and $Q_{s1}$ comparison so as to form two accumulates, $I_A$ and $Q_A$, respectively;

squaring each accumulate $I_A$ and $Q_A$, respectively, to form $I_A^2$ and $Q_A^2$;

summing $I_A^2$ and $Q_A^2$; and comparing $I_A^2+Q_A^2$ with a predetermined threshold and as a result of the comparison, making a determination of whether frame sync has been achieved is made.

21. A program storage device as in claim 20 wherein the program of instructions comprise at least one Very High Speed Integrated Circuit (VHSIC) Hardware Description (VHDL) Language file.

22. A device as in claim 8 wherein the device provides non-coherent power detection.

23. An integrated circuit as in claim 17 wherein the device provides non-coherent power detection.

24. A device comprising:

a channel despreader, wherein the channel despreader provides at least two each in-phase I1–In and, quadrature phase Q1–Qn channels, where $n \geq 2$;

at least one I-sync processor, wherein the at least one I-sync processor is coupled to the channel despreader, the at least one I-sync processor receiving I1–In data streams and providing an accumulated $I_A$ squared value as an output;

at least one Q-sync processor, wherein the at least one Q-sync processor is coupled to the channel despreader, the at least one Q-sync processor receiving Q1–Qn data streams and providing an accumulated $Q_A$ squared value as an output;

a first summer connected to the I-sync processor and the Q-sync processor to add the accumulated $I_A$ squared value and the accumulated $Q_A$ squared value to form a sum; and a comparator, wherein the comparator is coupled to the first summer and compares the sum to a predetermined threshold, wherein the device provides non-coherent power detection.

25. An integrated circuit (IC), wherein the integrated circuit comprises:

a channel despreader, wherein the channel despreader provides at least two each in-phase I1–In and quadrature phase Q1–Qn channels, where $n \geq 2$;

at least one I-sync processor, wherein the at least one I-sync processor is coupled to the channel despreader, the at least one I-sync processor receiving I1–In data streams and providing an accumulated $I_A$ squared value as an output;

at least one Q-sync processor, wherein the at least one Q-sync processor is coupled to the channel despreader, the at least one Q-sync processor receiving Q1–Qn data streams and providing an accumulated $Q_A$ squared value as an output;

a first summer connected to the I-sync processor and the Q-sync processor to add the accumulated $I_A$ squared value and the accumulated $Q_A$ squared value to form a sum; and a comparator, wherein the comparator is coupled to the first summer and compares the sum to a predetermined threshold, wherein the integrated circuit provides non-coherent power detection.

* * * * *

UNITED STATES PATENT AND TRADEMARK OFFICE
CERTIFICATE OF CORRECTION

PATENT NO. : 7,130,333 B2 Page 1 of 1
APPLICATION NO. : 09/995095
DATED : October 31, 2006
INVENTOR(S) : Leroy Andrew Gibson, Jr. et al.

It is certified that error appears in the above-identified patent and that said Letters Patent is hereby corrected as shown below:

Claim 8, Column 6, line 12, Please delete "sciuared" and replace with --squared--.

Claim 11, Column 6, line 57, Please delete "sciuared" and replace with --squared--.

Claim 14, Column 7, line 16, Please delete "sciuared" and replace with --squared--.

Signed and Sealed this

Second Day of January, 2007

JON W. DUDAS
*Director of the United States Patent and Trademark Office*